United States Patent
Allred, III et al.

(10) Patent No.: US 9,803,672 B2
(45) Date of Patent: Oct. 31, 2017

(54) SPLIT END TUBE CONNECTOR

(71) Applicant: Allred & Associates Inc., Elbridge, NY (US)

(72) Inventors: Jimmie B. Allred, III, Skaneateles, NY (US); Michael D. Griswold, Syracuse, NY (US); Timothy Braun, Auburn, NY (US)

(73) Assignee: ALLRED & ASSOCIATES INC., Elbridge, NY (US)

( * ) Notice: Subject to any disclaimer, the term of this patent is extended or adjusted under 35 U.S.C. 154(b) by 183 days.

(21) Appl. No.: 13/804,164

(22) Filed: Mar. 14, 2013

(65) Prior Publication Data
US 2014/0126953 A1    May 8, 2014

Related U.S. Application Data

(60) Provisional application No. 61/723,057, filed on Nov. 6, 2012.

(51) Int. Cl.
*F16B 11/00* (2006.01)

(52) U.S. Cl.
CPC ........... *F16B 11/008* (2013.01); *Y10T 403/47* (2015.01)

(58) Field of Classification Search
CPC ............. Y10T 403/55; Y10T 403/5733; Y10T 403/559; Y10T 403/53; Y10T 403/5786; Y10T 403/57; F16B 11/008; F16B 7/182; E04C 5/165
USPC ......... 403/79, 119, 157, 178, 289, 292, 293, 403/305, 309, 310, 311, 313
See application file for complete search history.

(56) References Cited

U.S. PATENT DOCUMENTS

| | | | | |
|---|---|---|---|---|
| 1,051,427 A | * | 1/1913 | McCluskey | 285/322 |
| 1,377,101 A | * | 5/1921 | Sparling | 403/313 |
| 2,300,653 A | * | 11/1942 | Cowing | 294/97 |
| 2,878,039 A | | 3/1959 | Hoegee et al. | |
| 3,598,433 A | * | 8/1971 | Savickas | 403/190 |
| 3,851,980 A | * | 12/1974 | Worth et al. | 403/172 |
| 3,885,820 A | | 5/1975 | Trumbull et al. | |
| 4,295,389 A | * | 10/1981 | Geisthoff | A01B 59/004 |
| | | | | 280/482 |
| 4,435,031 A | * | 3/1984 | Black et al. | 439/82 |

(Continued)

FOREIGN PATENT DOCUMENTS

| | | | | |
|---|---|---|---|---|
| DE | 4344666 A1 | * | 5/1994 | ............... F16B 7/04 |
| EP | 0652395 A1 | | 5/1995 | |

(Continued)

OTHER PUBLICATIONS

Single Lock Splice-Lock™ connections from The Wagner Companies. at least as early as 2010. http://www.wagnercompanies.com/Single_Splice-Lock_Mechanical_Connector.aspx.

(Continued)

*Primary Examiner* — Jonathan Masinick
(74) *Attorney, Agent, or Firm* — Brown & Michaels, PC

(57) ABSTRACT

A split end tube connector connects fiber reinforced composite tubes, and in particular carbon fiber tubes. The tube connector end inserted into the carbon fiber tube is split lengthwise to alleviate peel stresses caused by thermal contraction of the connector as a result of temperature changes. In a preferred embodiment, the split end tube connector is made from a metal, such as aluminum, steel, or titanium.

20 Claims, 18 Drawing Sheets

(56) References Cited

U.S. PATENT DOCUMENTS

| | | | | |
|---|---|---|---|---|
| 4,681,477 | A | * | 7/1987 | Fischer .................... 403/298 |
| 4,907,908 | A | * | 3/1990 | Gerhard ................ E05C 9/20 403/380 |
| 5,069,076 | A | * | 12/1991 | Rosenthal ................... 74/89.44 |
| 5,082,314 | A | | 1/1992 | Aubry |
| 5,188,539 | A | | 2/1993 | Langdon |
| 5,193,932 | A | * | 3/1993 | Wu .............................. 403/307 |
| 5,219,449 | A | * | 6/1993 | Hoshino ....................... 403/297 |
| 5,346,237 | A | | 9/1994 | Wang |
| 5,704,728 | A | * | 1/1998 | Chan ............................ 403/298 |
| 5,927,894 | A | * | 7/1999 | Zavaglia ....................... 403/299 |
| 5,960,894 | A | * | 10/1999 | Lilly et al. ..................... 175/4.6 |
| 5,992,804 | A | * | 11/1999 | Johnson ........................ 248/157 |
| 6,883,998 | B2 | * | 4/2005 | Bullivant ...................... 403/313 |
| 6,994,367 | B2 | * | 2/2006 | Mock et al. ................. 280/288.1 |
| 7,574,777 | B1 | * | 8/2009 | Fuller et al. .................... 16/436 |
| 7,909,613 | B2 | | 3/2011 | Lee et al. |
| 8,262,825 | B2 | | 9/2012 | Fahey et al. |
| 2002/0159829 | A1 | * | 10/2002 | Kruger ................ F16B 5/0233 403/374.1 |
| 2013/0034380 | A1 | * | 2/2013 | Cutsforth ...................... 403/110 |

FOREIGN PATENT DOCUMENTS

| | | | | |
|---|---|---|---|---|
| JP | | 0419493 A | 1/1992 | |
| JP | | 05280514 A | * 10/1993 | ................ F16B 7/04 |

OTHER PUBLICATIONS

Double Lock Splice-Lock™ connections from The Wagner Companies. at least as early as 2009. http://www.wagnercompanies.com/Double_Splice-Lock_Connector.aspx.

International Search Report and Written Opinion for PCT/US2013/067198, dated Oct. 29, 2013.

* cited by examiner

SPLIT END TUBE CONNECTOR

REFERENCE TO RELATED APPLICATIONS

This application claims one or more inventions which were disclosed in Provisional Application No. 61/723,057, filed Nov. 6, 2012, entitled "SPLIT END TUBE CONNECTOR". The benefit under 35 USC §119(e) of the United States provisional application is hereby claimed, and the aforementioned application is hereby incorporated herein by reference.

BACKGROUND OF THE INVENTION

Field of the Invention

The invention pertains to the field of tube connectors. More particularly, the invention pertains to connectors for fiber reinforced composite tubes.

Description of Related Art

Tube connectors and tube splices are well known across many applications. Very few innovations exist, however, that are specific to connecting fiber reinforced tubes, and in particular carbon fiber tubes.

U.S. Pat. No. 2,878,039 (Hoegee) discloses a collet and ferrule type clamp hose coupling intended for inflight aircraft refueling.

U.S. Pat. No. 5,082,314 (Aubry) discloses a joint for connecting composite tubes using an annular metallic ferrule with a flat portion, as well as a curved portion.

U.S. Pat. No. 5,346,237 (Wang) discloses a bicycle frame constructed from carbon fiber tubes joined by metal connectors. The metal connectors include threaded sockets and metal connecting members.

U.S. Pat. No. 8,262,825 (Fahey) discloses a method for axially connecting filament wound composite tubes by winding bands of fibers around an underlying end-fitting.

In addition, adjustable and tightening tube splices are available, such as the Splice-Lock™ connections from The Wagner Companies (Milwaukee, Wis.), which insert into the end of a tube and mechanically expand, putting pressure on the tube wall to prevent the splice from pulling out.

SUMMARY OF THE INVENTION

A split end tube connector connects fiber reinforced composite tubes. In preferred embodiments, the fiber reinforced composite tubes are made of carbon fiber. The tube connector end inserted into the carbon fiber tube is split lengthwise to alleviate peel stresses caused by thermal contraction of the connector as a result of temperature changes. In a preferred embodiment, the split end tube connector is made from a metal, such as aluminum, steel, or titanium.

In one preferred embodiment, a split end tube connector includes an external end and a first internal end. The first internal end fits into a first tube and includes two or more longitudinal slots. In some preferred embodiments, the first internal end also includes at least one ridge substantially perpendicular to the slots. In some embodiments, the first tube is preferably made of carbon fiber. In some preferred embodiments, the external end includes a second internal end that fits inside a second tube and includes two or more longitudinal slots. In some preferred embodiments, the second internal end also includes at least one ridge substantially perpendicular to the slots.

In another preferred embodiment, a split end tube connector system includes at least one split end tube connector with a first internal end and an external end and at least one first tube having a first end and a second end, where the first internal end of the split end tube connector is bonded into a first end of the first tube. The first internal end includes two or more longitudinal slots. In some preferred embodiments, the first internal end also includes at least one ridge substantially perpendicular to the slots. In preferred embodiments, the first tube is made of carbon fiber. In other preferred embodiments, the external end includes a second internal end that is bonded inside a second tube and includes two or more longitudinal slots. In some preferred embodiments, the second internal end also includes at least one ridge substantially perpendicular to the slots.

DETAILED DESCRIPTION OF THE INVENTION

Tube connectors and tube splices are well known across many applications. Within the field of fiber reinforced composite tubes, and in particular carbon fiber tubes, there exists a challenge whereby the coefficient of thermal expansion for the carbon fiber tube and the tube connector may be very different. This is the case if a metal or plastic tube connector is utilized with a carbon fiber tube. Since the coefficient of thermal expansion for the carbon fiber tube is much smaller than that for the metal or plastic part, there is the potential, under changing temperature, and in particular cold temperature, for the tube connector to shrink, thus creating a peel stress on the adhesive bond between the tube and connector.

As a result, delamination of the tube connector from the tube inner wall surface may occur.

Figure 1:
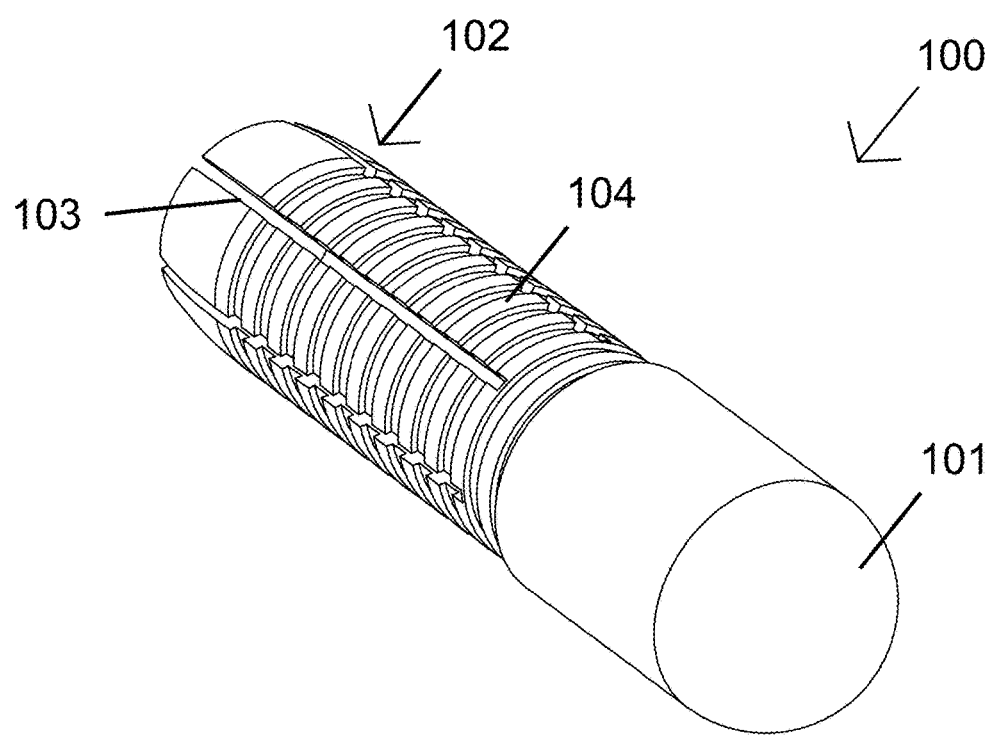
FIG. 1 shows a split tube connector with a blank external end.
Figure 2:
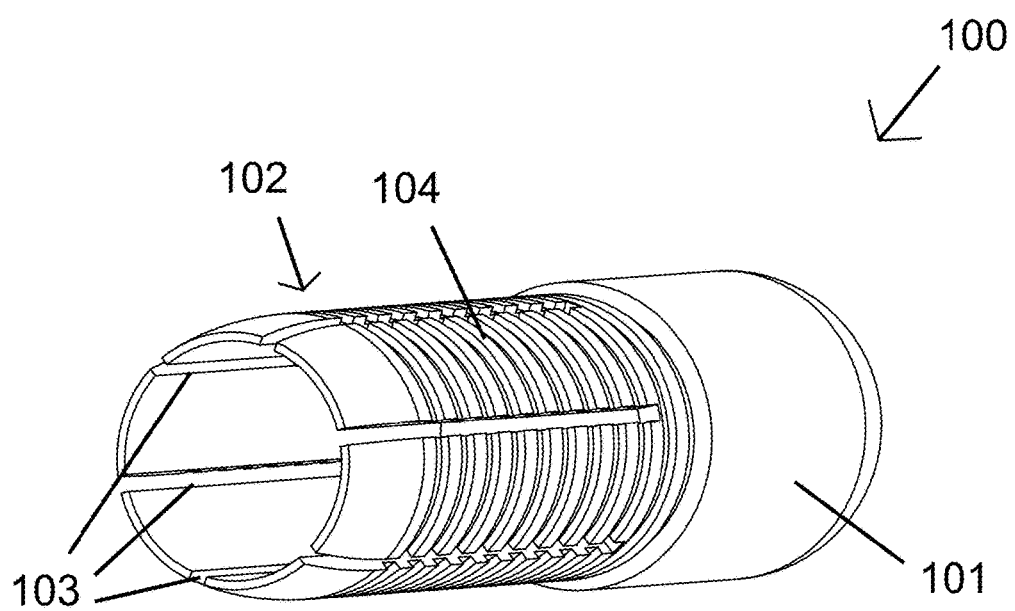
FIG. 2 shows an alternate view of the split tube blank connector of FIG. 1.
Figure 3:
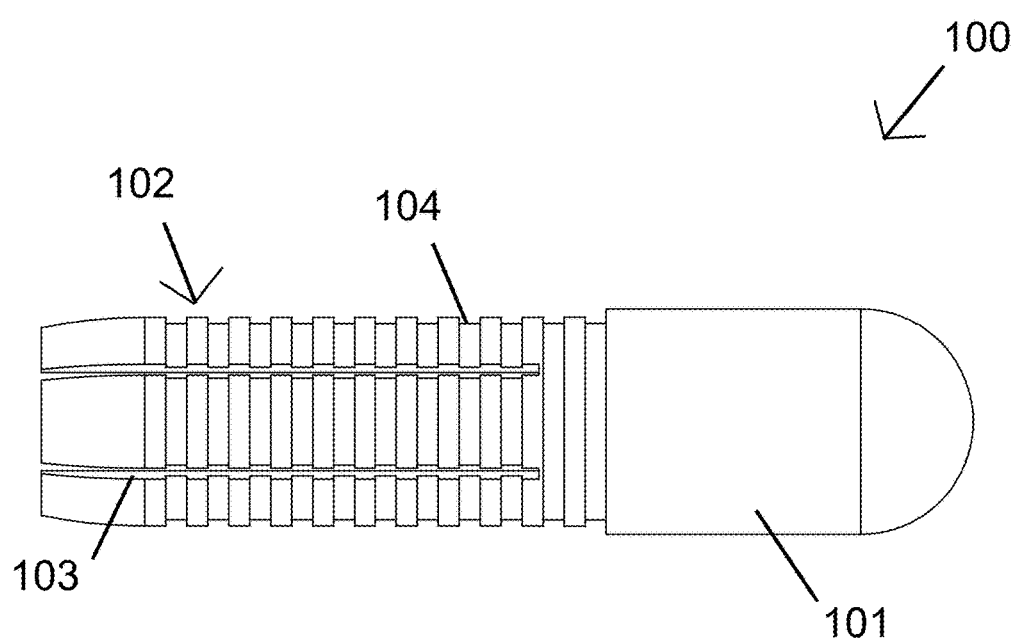
FIG. 3 shows a side view of the split tube blank connector of FIG. 1.

The tube connectors described herein alleviate this problem by using a split end for the portion of the tube connector inserted and bonded into the carbon fiber tube. FIGS. 1-3 show the basic tube connector 100 with a blank external end 101 (i.e. no specific connection method on the external end 101 used to attach the tube connector 100 to either another tube connector or an accessory). In FIG. 1, the tube connector has an internal end 102 that is split longitudinally, and is inserted into the carbon fiber tube and bonded into place with an adhesive, such as epoxy. FIG. 2 shows an alternate view of the internal end, which is tubular in construction. By splitting the tubular end of the connector, additional compliance is offered in the case where large temperature changes occur. That is, if the temperature drops, the tube connector material will shrink; however, the longitudinal slots 103 cause the tube connector to be locally weakened in the radial direction, thus the amount of peel stress the tube connector 100 can impart on the adhesive bond is reduced, decreasing the chances of a peel failure. The longitudinal slots 103 created by the split tube construction also increase the bond surface area perpendicular to the tube surface. These surfaces act to maintain the bond strength in the shear direction. Since adhesive shear strength is typically one to two orders of magnitude greater than adhesive peel strength, this greatly improves the strength of the bond overall. While six longitudinal slots are shown in the figures, any number of slots are possible in alternative embodiments. For example, in some preferred embodiments, there are two to eight longitudinal slots 103 on the tube connectors described herein. In addition, ridges 104 may be added to the internal end 102, which further increase the surfaces acting in shear, thus offering additional resistance to peel failures.

Figure 4:
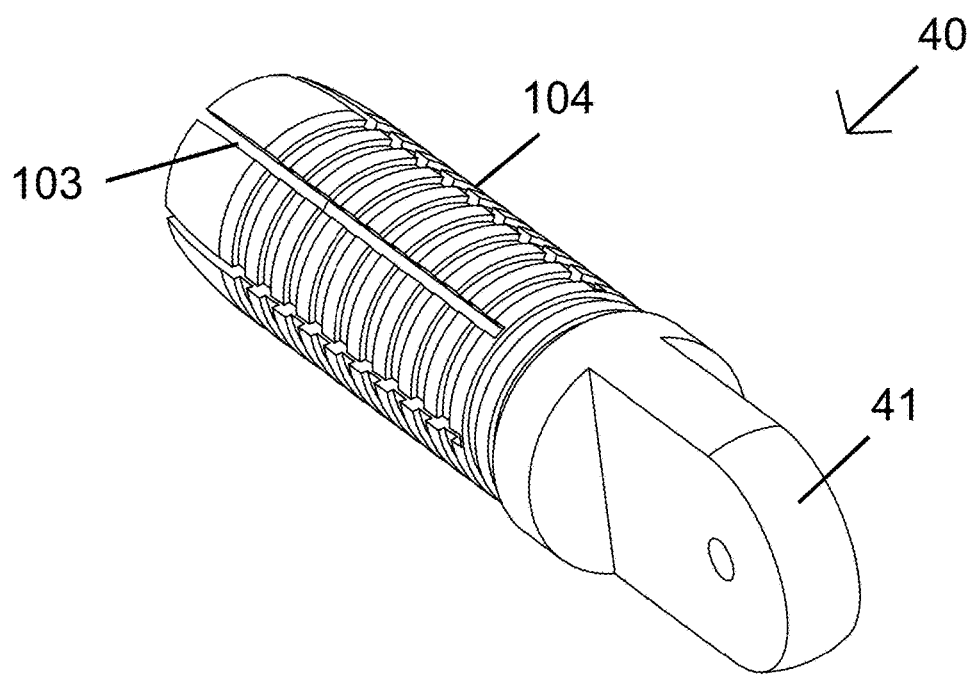
FIG. 4 shows a split tube connector with the blank end machined to be a single male external connection.
Figure 5:
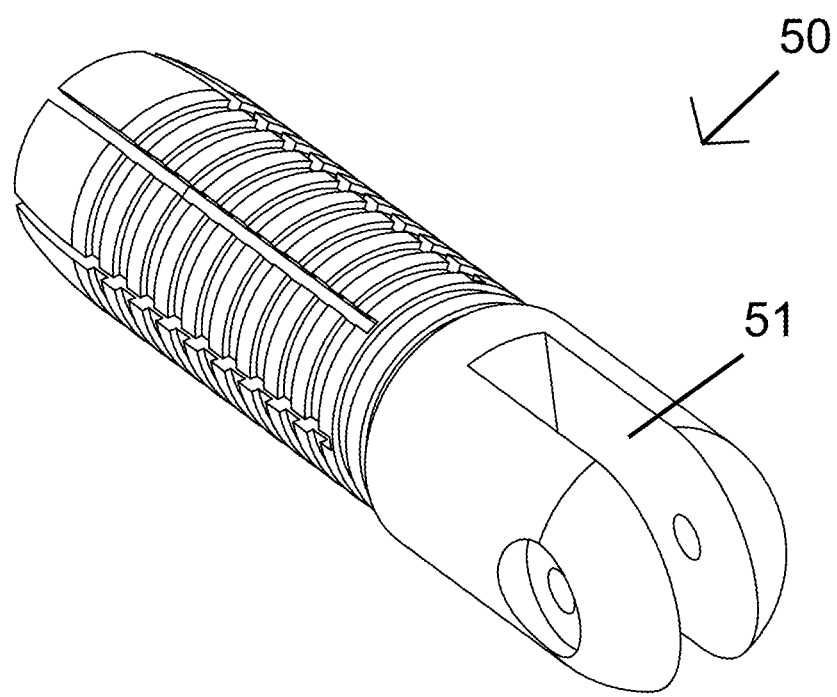
FIG. 5 shows a split tube connector with the blank end machined to be a single female external connection.
Figure 6:
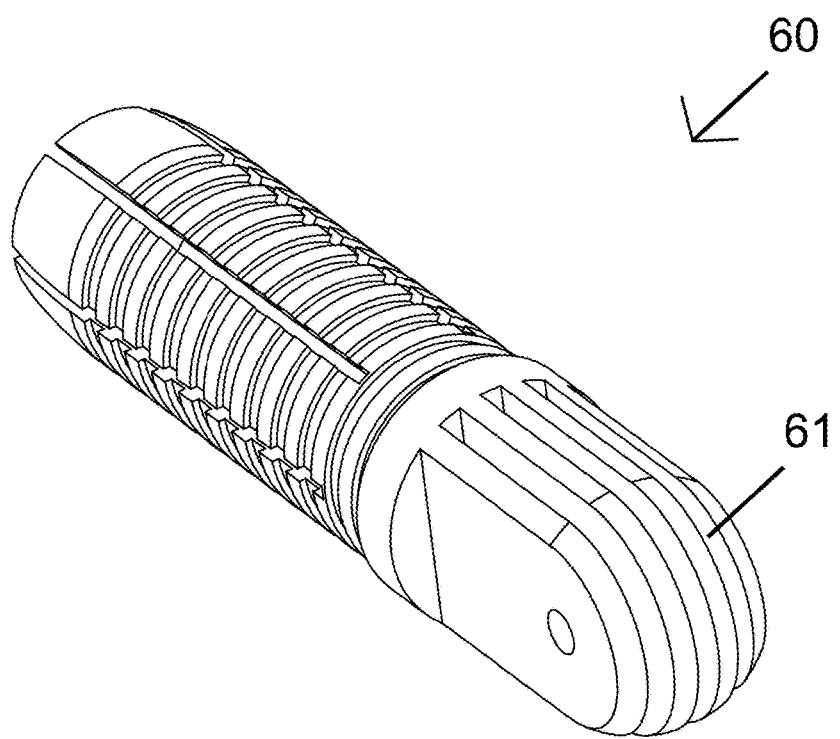
FIG. 6 shows a split tube connector with a four-slotted male external connection.
Figure 7:
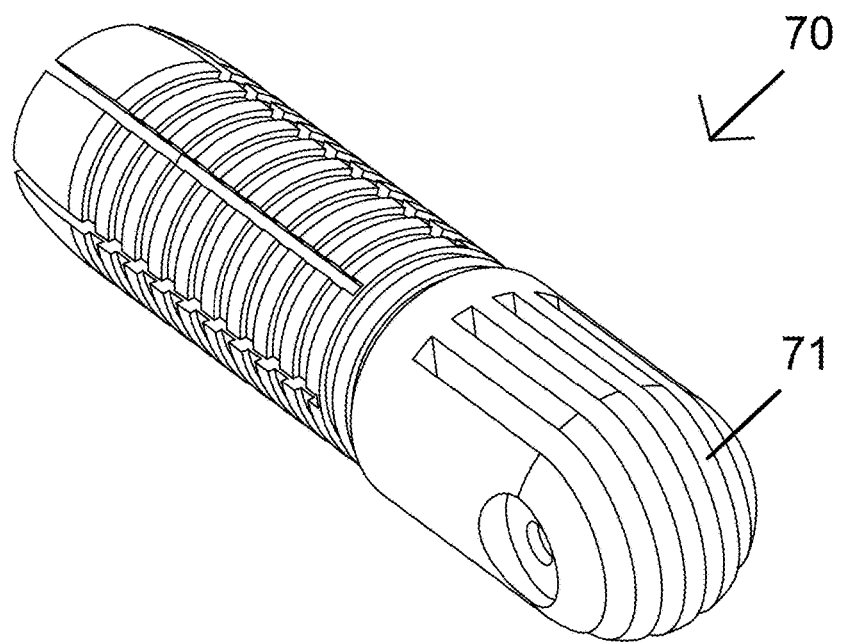
FIG. 7 shows a split tube connector with a four-bladed female external connection.
Figure 8:
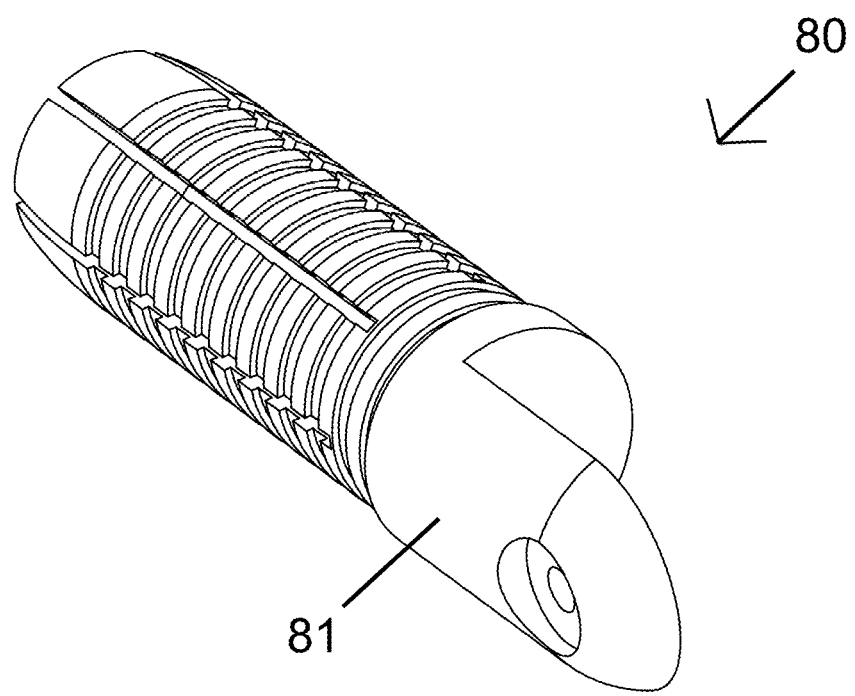
FIG. 8 shows a split tube connector with the blank end machined to be a single outside blade.

FIGS. 4-8 show various external connection ends. FIGS. 4 and 5 show a single-bladed male connection 40 and a single-slotted female connection 50, respectively. The single-bladed male connection 40 has a single external connection blade 41, which mates with the single slot 51 on the single-slotted female connection 50. FIGS. 6 and 7 show a four-bladed male connection 60 and a four-slotted female connection 70, respectively. The four-bladed male connection 60 has four external connection blades 61, which mate with the four slots 71 on the four-slotted female connection 70. In another embodiment, a single outside blade connector 80, which contains a single outside blade 81, can be utilized, as shown in FIG. 8. While one and four bladed male connections are shown in the figures, in preferred embodiments, the bladed male connectors have one to eight blades. Similarly, while one and four slotted female connections are shown in the figures, in preferred embodiments, the slotted female connectors have one to eight slots.

Figure 9:
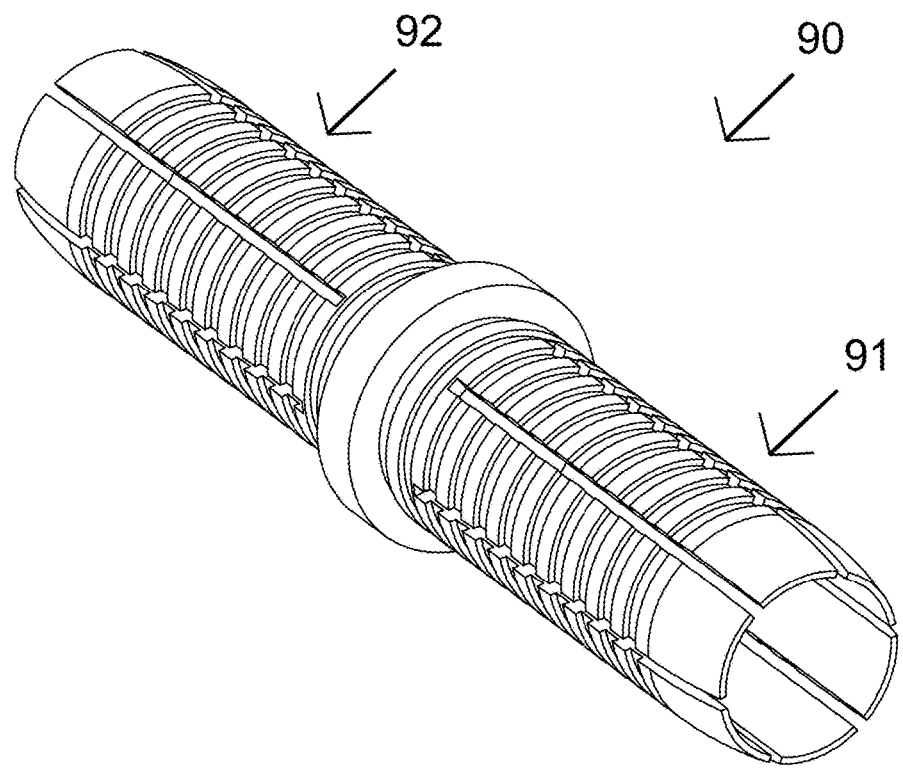
FIG. 9 shows a tube connector with both ends split for internal use.

Alternatively, the external end can instead be utilized as another split end internal connection, as shown in FIG. 9, for insertion directly into another tube. In this case, the tube connector is being used as a tube splice 90, with two internal ends 91, 92.

Figure 10:
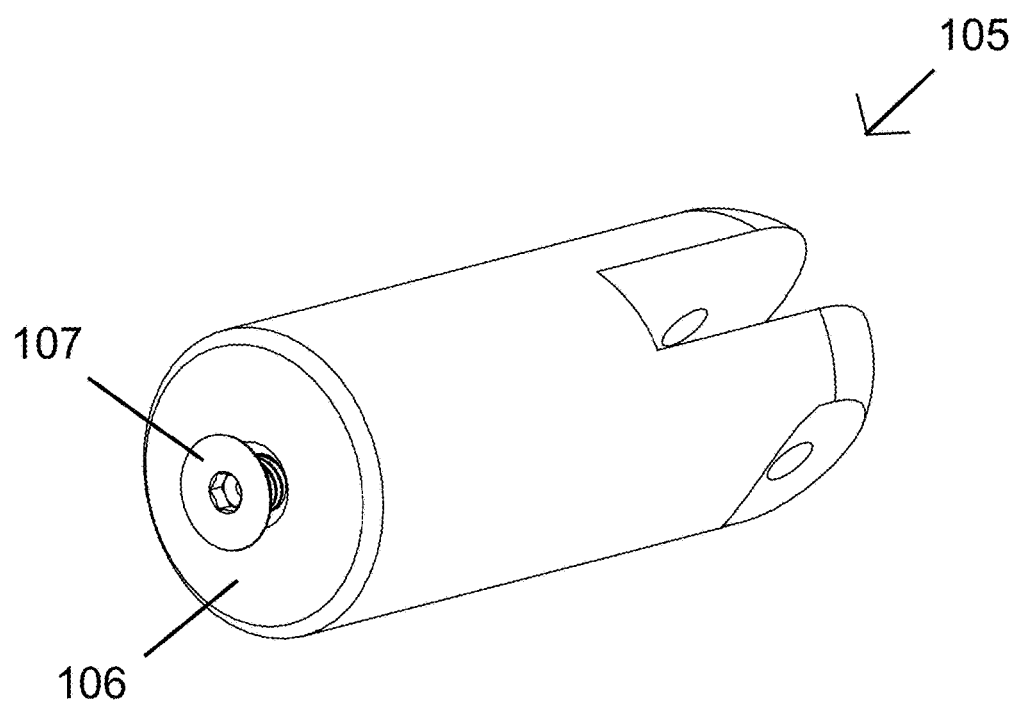
FIG. 10 shows a truncated single-slotted female connector.
Figure 11:
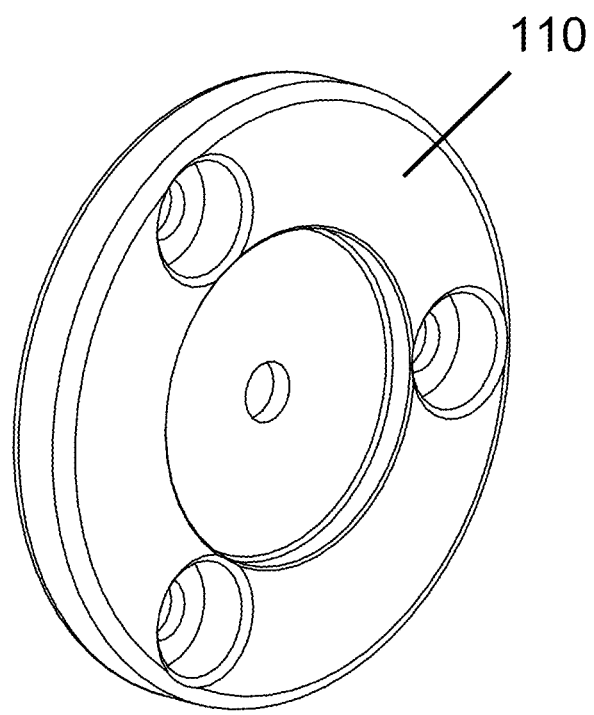
FIG. 11 shows a base plate.

In another embodiment of the connector 105, shown in FIG. 10, instead of an internal end 102, the end 106 is truncated and flattened, with a threaded hole and bolt 107 for connection to another tube connector or base plate 110 (shown in FIG. 11).

Figure 12:
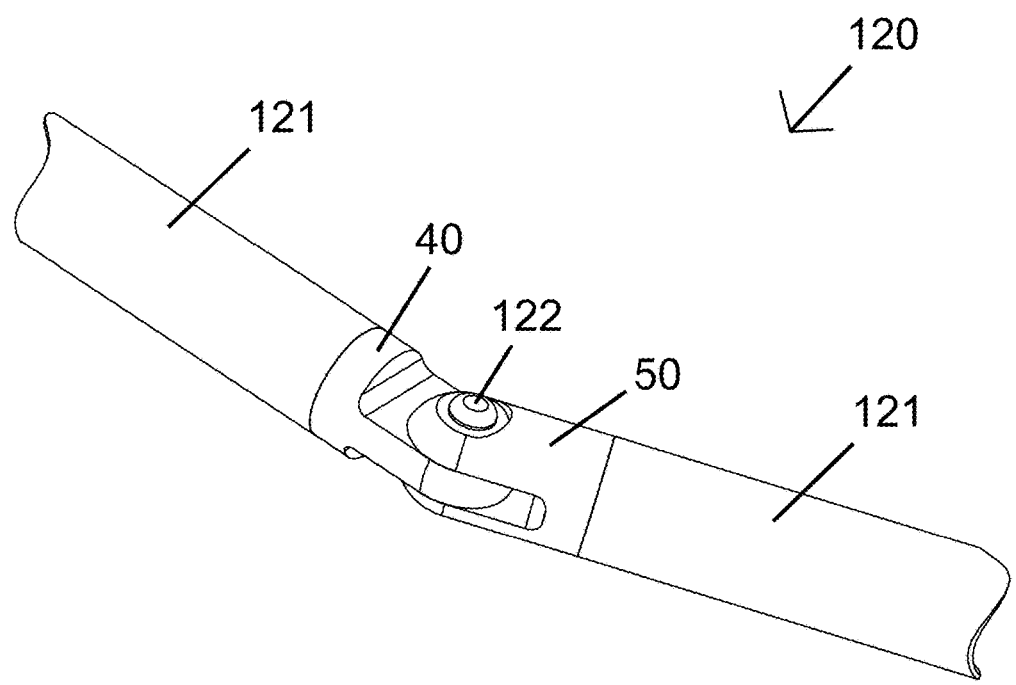
FIG. 12 shows a single-bladed/single-slotted yoke connection.
Figure 13:
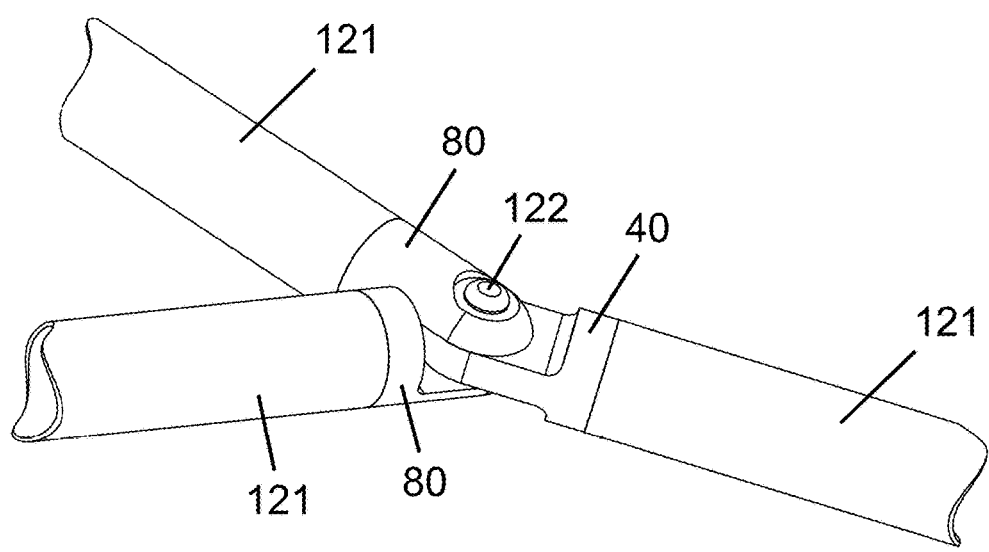
FIG. 13 shows a 3-connector in-plane triple connection.
Figure 14:
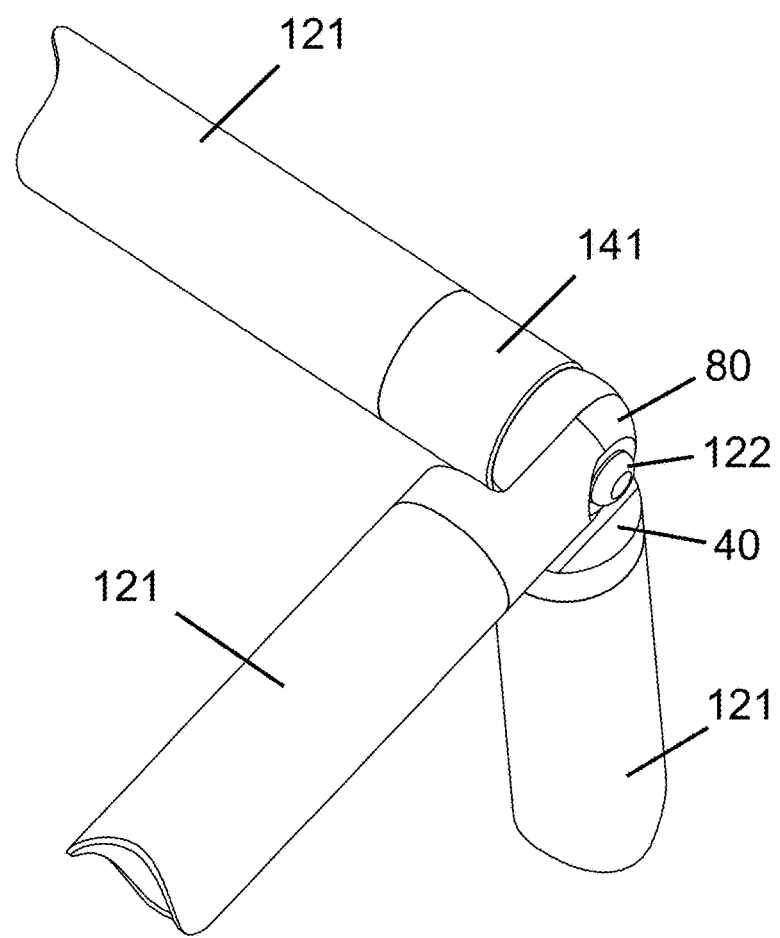
FIG. 14 shows a 3-connector right-angle connection.
Figure 15:
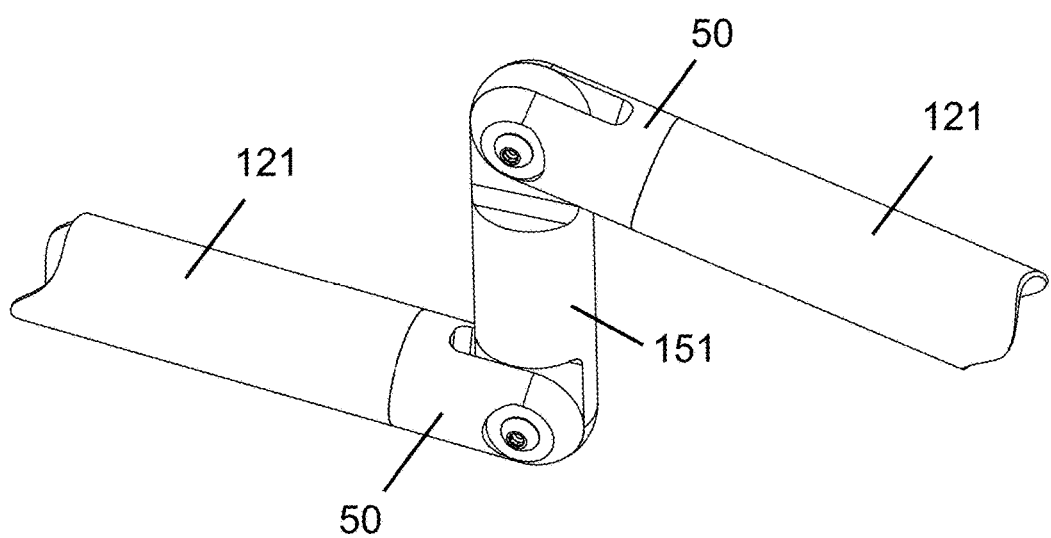
FIG. 15 shows a single-slot female-to-female connection via a single-bladed male-to-male adapter.
Figure 16:
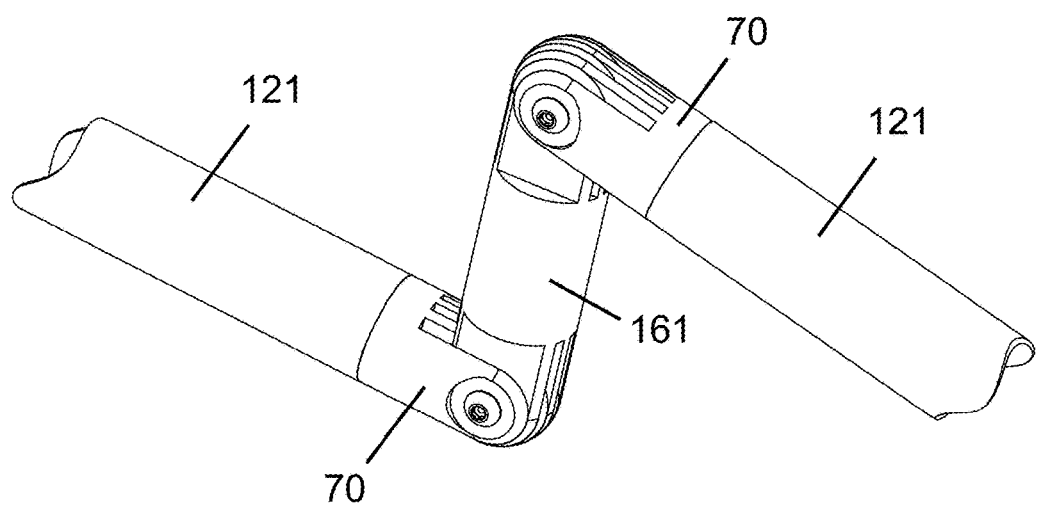
FIG. 16 shows a four-slotted female-to-female connection via a four-bladed male-to-male adapter.

FIGS. 12-16 show how these connectors are attached to one another and the tubes 121 with fasteners 122 in various configurations. FIG. 12 shows a single-bladed/single-slotted yoke connection 120. FIG. 13 shows a three connector in-plane triple connection. FIG. 14 shows a three connector right-angle connection. The tube connector 141 includes a flat external end like the end 106 shown in FIG. 10. FIG. 15 shows a single-slot female-to-female connection via a single-bladed male-to-male adapter 151. FIG. 16 shows a four-slotted female-to-female connection via a four-bladed male-to-male adapter 161.

Figure 17:
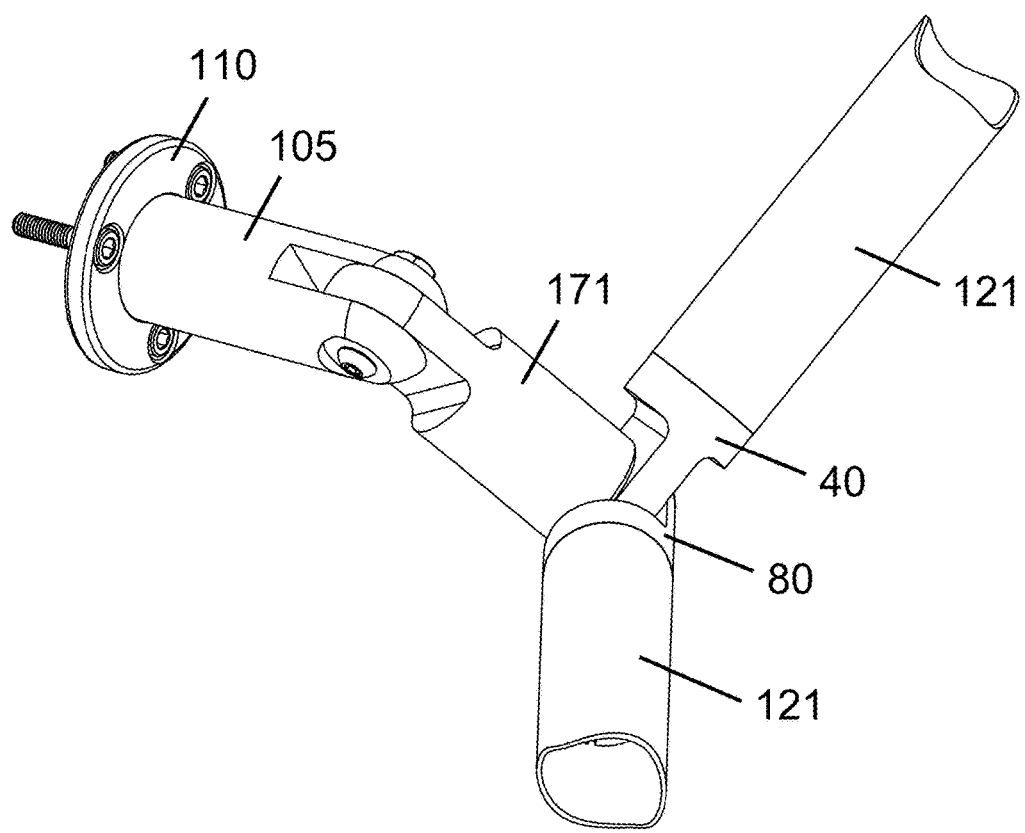
FIG. 17 shows a base plate and truncated single-slotted female connector added to a right-angle joint with three connectors.
Figure 18:
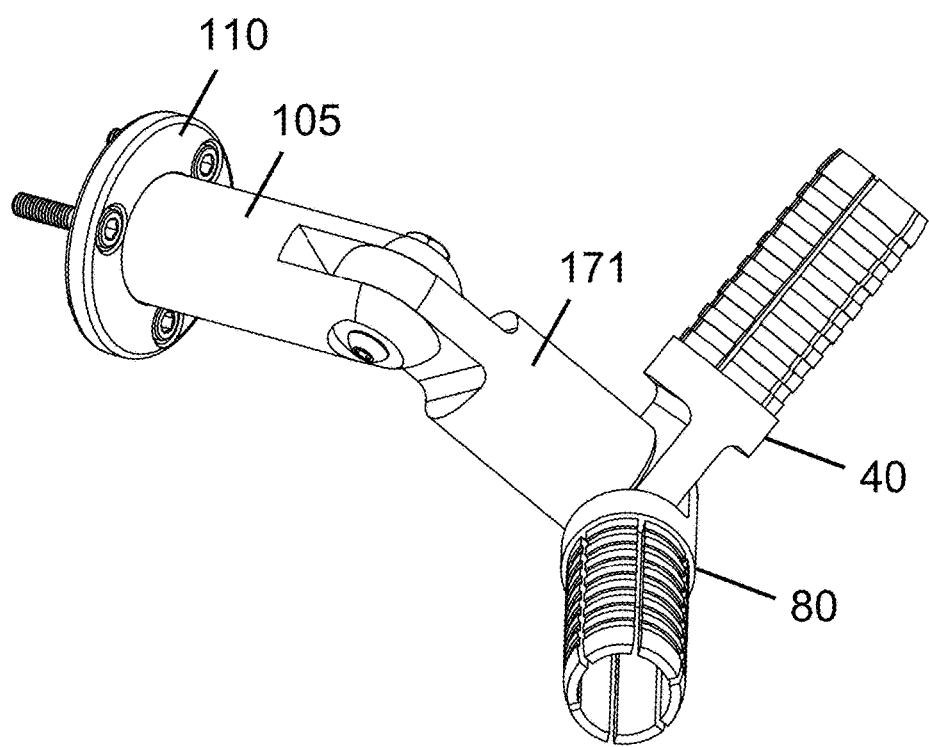
FIG. 18 shows the connector system of FIG. 17, but with the tubes hidden.

FIG. 17 shows a base plate 110 and truncated single-slotted female connector 105 added to a right-angle joint including three connectors 40, 80, 171. The tube connector 171 includes an external end 40 and a flattened end 106. FIG. 18 shows the connector system of FIG. 17, with the tubes 121 hidden.

In preferred embodiments, the split end tube connectors are made from a metal, such as aluminum, steel, or titanium. In other embodiments, the split tube connector is plastic. In preferred embodiments, the material for the tubes is carbon fiber. In other embodiments, the tubes are made of fiberglass or another fiber reinforced plastic.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A split end tube connector system comprising:
   a) at least one split end tube connector comprising:
      i) a first hollow internal end; and
      ii) an external end,
      wherein the first hollow internal end includes two or more longitudinal slots and at least one ridge, the at least one ridge comprising a bottom wall substantially parallel to the slots and two side walls substantially perpendicular to the slots; and
   b) at least one first carbon fiber tube having a first end and a second end, wherein the first hollow internal end of the split end tube connector is fastened to the first carbon fiber tube by adhesively bonding the first hollow internal end of the split end tube connector into the first end of the first carbon fiber tube,
   wherein the first hollow internal end is hollow, immediately radially inwardly adjacent any point the split end tube connector is adhesively bonded into the first end of the first carbon fiber tube.

2. The system of claim 1, wherein an epoxy adhesive adhesively bonds the first internal end of the split end tube connector into the first end of the first carbon fiber tube.

3. The system of claim 1, wherein the split end tube connector is made of a material selected from the group consisting of aluminum, steel, and titanium.

4. The system of claim 1, wherein the external end comprises a bladed male connector with one to eight blades.

5. The system of claim 1, wherein the external end comprises a slotted female connector with one to eight slots.

6. The system of claim 1, wherein the external end comprises a second internal end that is adhesively bonded inside a second carbon fiber tube and comprises two or more longitudinal slots.

7. The system of claim 6, wherein the second internal end further comprises at least one ridge substantially perpendicular to the slots.

8. The system of claim 6, wherein an epoxy adhesive adhesively bonds the second internal end of the split end tube connector into the second carbon fiber tube.

9. The split end tube connector system of claim 1, wherein the external end of the split end tube connector is designed to attach to a component selected from the group consisting of: a second split end tube connector, a second carbon fiber tube and an accessory.

10. A split end tube connector system comprising:
   a) at least one split end tube connector comprising:
      i) a first hollow internal end;
      ii) an external end; and
      iii) an outer portion inclusively between the first hollow internal end and the external end;
      iii) a first plurality of ridges on the outer portion, each ridge of the first plurality of ridges having a bottom wall substantially parallel to a longitudinal axis of the split end tube connector and two side walls substantially perpendicular to the longitudinal axis of the split end tube connector, the first plurality of ridges covering a first longitudinal length of the outer portion of the split end tube connector, the first longitudinal length extending less than an entire longitudinal length of the split end tube connector,
   wherein the first internal end comprises two or more longitudinal slots; and
   b) at least one first carbon fiber tube having a first end and a second end, wherein the first internal end of the split end tube connector is adhesively bonded into the first end of the first carbon fiber tube,
   wherein the longitudinal slots locally weaken the tube connector in the radial direction.

11. The system of claim 10, wherein an epoxy adhesive adhesively bonds the first internal end of the split end tube connector into the first end of the first carbon fiber tube.

12. The system of claim 10, wherein the split end tube connector is made of a material selected from the group consisting of aluminum, steel, and titanium.

13. The system of claim 10, wherein the external end comprises a bladed male connector with one to eight blades.

14. The system of claim 10, wherein the external end comprises a slotted female connector with one to eight slots.

15. The system of claim 10, wherein the external end comprises a second internal end that is adhesively bonded inside a second carbon fiber tube and comprises two or more longitudinal slots.

16. The system of claim 15, wherein the second internal end further comprises a second plurality of ridges substantially perpendicular to the slots.

17. The system of claim 15, wherein an epoxy adhesive adhesively bonds the second internal end of the split end tube connector into the second carbon fiber tube.

18. The split end tube connector system of claim 10, wherein the external end of the split end tube connector is designed to attach to a component selected from the group consisting of: a second split end tube connector, a second carbon fiber tube and an accessory.

19. A split end tube connector system comprising:
   a) at least one split end tube connector including:
      i) a first hollow internal end;
      ii) an external end;
      iii) an outer portion inclusively between the first hollow internal end and the external end;
      iii) at least one ridge on the outer portion, the at least one ridge having a bottom wall substantially parallel to a longitudinal axis of the split end tube connector and two side walls substantially perpendicular to the longitudinal axis of the split end tube connector; and
      v) two or more longitudinal slots extending through the at least one ridge, each slot extending through the at least one ridge further extending only through the first hollow internal end,
   and
   b) at least one first carbon fiber tube having a first end and a second end, wherein the first internal end of the split end tube connector is adhesively bonded into the first end of the first carbon fiber tube.

20. The system of claim 19, wherein the first hollow internal end has an outer surface with a diameter that tapers.

* * * * *